Figure 1:
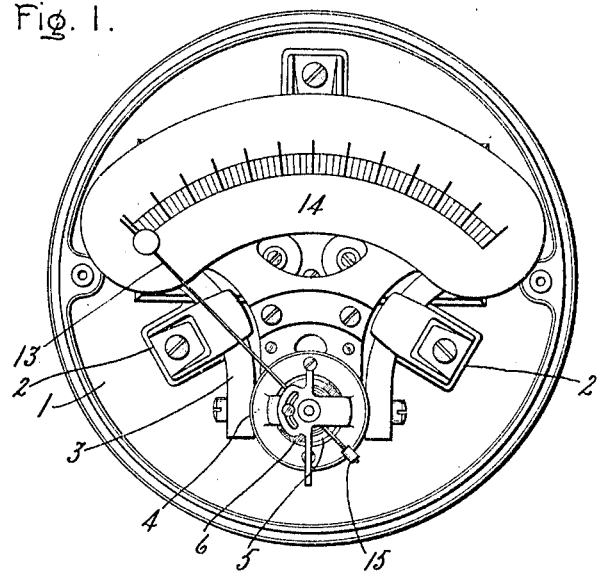

C. E. HOLMES.
MEASURING INSTRUMENT.
APPLICATION FILED JULY 18, 1908.

994,923.

Patented June 13, 1911.

2 SHEETS—SHEET 1.

Witnesses:
George W. Tilden
J. Ellis Glen

Inventor:
Charles E. Holmes,
by Albert G. Davis
Att'y.

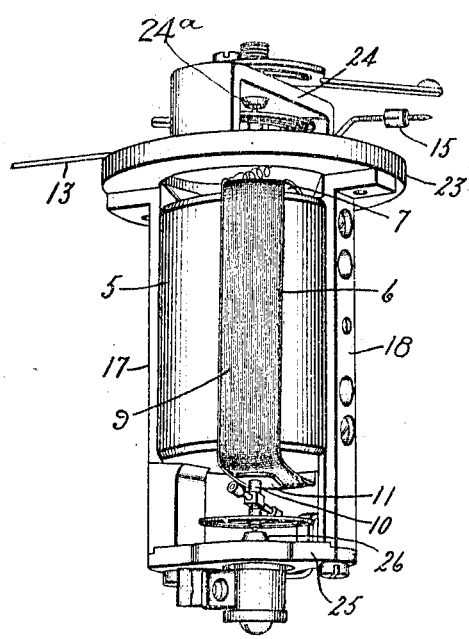
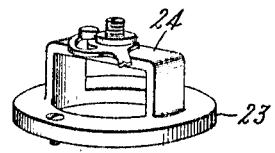
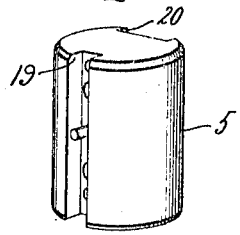
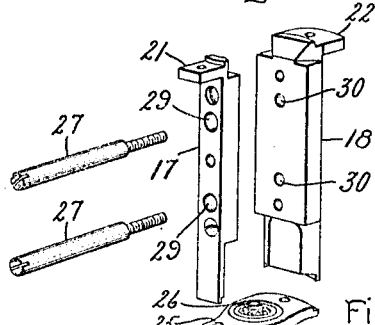
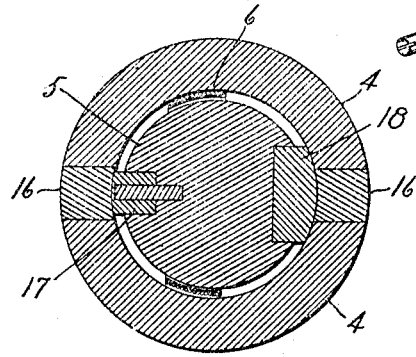
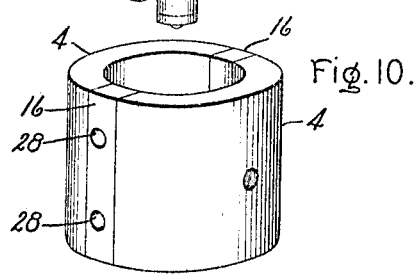

UNITED STATES PATENT OFFICE.

CHARLES E. HOLMES, OF LYNN, MASSACHUSETTS, ASSIGNOR TO GENERAL ELECTRIC COMPANY, A CORPORATION OF NEW YORK.

MEASURING INSTRUMENT.

994,923.

Specification of Letters Patent.  Patented June 13, 1911.

Application filed July 18, 1908. Serial No. 444,217.

*To all whom it may concern:*

Be it known that I, CHARLES E. HOLMES, a citizen of the United States, residing at Lynn, in the county of Essex and State of Massachusetts, have invented certain new and useful Improvements in Measuring Instruments, of which the following is a specification.

My invention relates to measuring instruments and more particularly to instruments having a moving coil and a permanent magnet with an annular air gap through which the coil moves.

Measuring instruments having a permanent magnet for producing the field should have a very narrow air gap and a very light moving coil. In one type of instrument the magnet has pole pieces with circular faces, and a cylindrical core is fixed concentric with the pole pieces, leaving a very narrow annular air gap between the faces of the pole pieces and the surface of the core, while a light moving coil is made by winding fine wires on a rectangular framework of very thin aluminum or other non-magnetic material mounted on pivots concentric with the annular air gap. The coil must be thin enough to swing freely through the air gap and must be made comparatively wide in order to give the necessary torque, so that the frame upon which the coil is wound must be made in the shape of a cylinder slightly larger than the core and mounted concentric therewith. Since the clearance between the core and the frame is very slight, the distance between the edges of the framework is often less than the diameter of the core, so various expedients, such as cutting a groove in the core, must be resorted to in order to slip the framework over the core and bring it into a position where it can swing freely in the annular air gap. The coil frame must be shaped about a cylindrical former slightly larger than the core and made collapsible to permit removal of the former from the interior of the coil frame. Difficulties are encountered in maintaining the cylindrical core exactly concentric with the pole pieces, particularly where the core and coil are removable from between the pole pieces, and also in preventing injury to the coil when the moving system is removed, while in instruments in which the pole pieces are independent and are mounted on opposite ends of a comparatively large magnet any distortion or change of shape in the magnet causes relative movement of the pole pieces and distorts the air gap.

The object of my invention is to provide a measuring instrument with an easily constructed moving coil which, conforming to the shape of the core and swinging about it freely with a very slight clearance, can be easily slipped over a plain cylindrical core to swing concentric therewith; which is so mounted that its weight partially counterbalances the weight of the pointer, thereby eliminating heavy counter weights and rendering the moving system as a whole lighter than those heretofore used, which has the pole pieces held in rigid relation to each other, and fitted to the magnet by machined surfaces, in which the core is accurately placed in proper relation to the pole pieces without necessity of changes and adjustments by skilled labor, in which the moving coil cannot be damaged by striking against the pole pieces during removal and replacement of the moving system, and in which various details of construction are improved.

My invention will best be understood in connection with the accompanying drawings, which are merely illustrative of one embodiment thereof, and in which—

Figure 2:
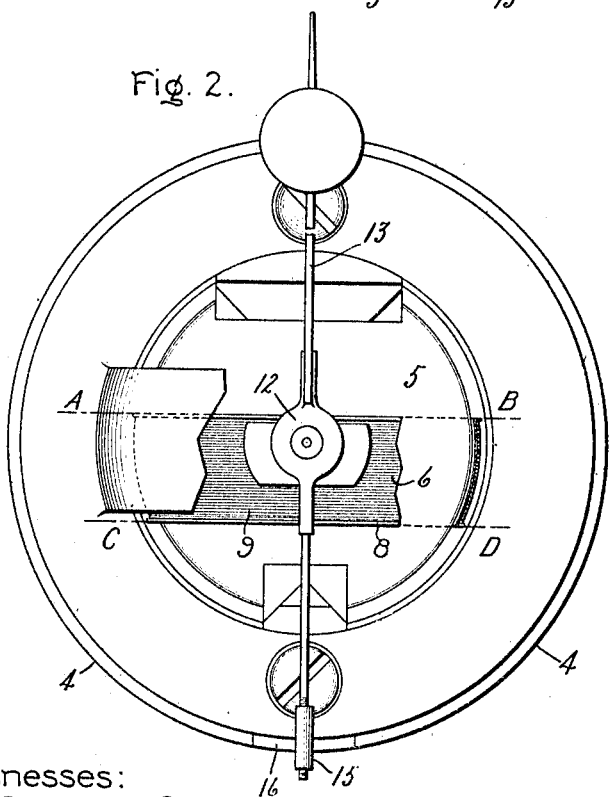
Figure 3:
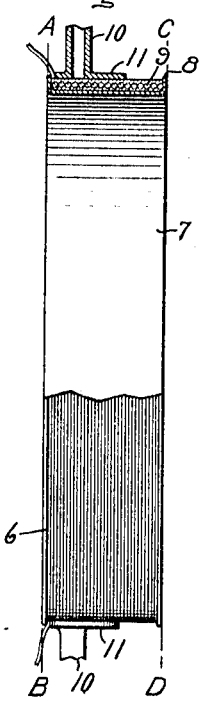

Figure 1 is a plan view of an instrument embodying my invention; Fig. 2 is an enlarged view showing the relation of the moving system to the pole pieces and the core; Fig. 3 is a view, partly in section, of the moving coil showing the location of the pivots thereon; Fig. 4 is a view in perspective of the core and the moving coil removed from the instrument; Fig. 5 is a cross-section of the pole pieces, core and moving coil, showing their relative positions; while Fig. 6 shows a cap or core support; Fig. 7 the core; Fig. 8 the radial projections or ribs on the core with the screws for fastening the core in position between the pole pieces; Fig. 9 the cross-piece carrying the lower bearing for the coil; and Fig. 10 the integral pole-piece structure as machined and ready for the attachment of the other parts of the instrument.

The instrument shown in the drawings comprises a base 1 of the usual form having clamps 2 for the purpose of firmly holding the permanent magnet 3 in its proper position on the base. This magnet is provided with detachable annular pole pieces 4, shown in Figs. 5 and 10, which encircle a cylindrical core 5 concentric with the concave faces of the pole pieces and of such a diameter that a narrow annular air gap is left between the surface of the core and the faces of the pole pieces. The moving coil 6 is mounted concentric with the core and its sides move through the annular air gap between the pole pieces and the core.

The form of the moving coil 6 of the instrument is best shown in Figs. 2 and 3. The framework or shell 7 with flanges 8 acts as a support for the wires and also as a damping frame to render the instrument deadbeat, and is made of aluminum or other suitable metal stamped into the shape shown in Fig. 2, with the sides of the shell which move through the annular air gap made in the form of portions of a cylinder slightly larger than the core 5, these portions being included between a plane A B slightly to one side of the center of the cylinder and a plane C D parallel to A B and some distance on the other side of the center. The sides of the shell are therefore unsymmetrical with reference to a plane passing through the two sides and the axis of the cylinder of which they are a part. The width of the opening in the frame 7 along the plane A B is substantially the same as the diameter of the core, while the width of the opening on the plane C D is very considerably less than the diameter of the core, while the greatest distance across the shell is along a diameter very close to the plane A B but between that plane and the plane C D. If the air gap is sufficiently great the sides of the shell need not be truly cylindrical so long as the coil swings freely, but it is desirable to make the air gap narrow and the sides of the shell cylindrical to obtain proper clearance.

After the shell is formed, the wires 9 are wound thereon and then the pivots 10 with bases 11 are secured to the coil or in any suitable way at the extremities of that diameter which passes through both sides of the coil and is parallel to the plane A B. The current is led to the coil from controlling springs to which the ends of the wires 9 are connected in the usual manner. Since the pivots as shown in Fig. 3 are mounted on the diameter of the coil very near one side thereof, the greater portion of the coil is on one side of the diameter joining the pivots. A hub 12 for the pointer attached to one of the pivots carries an index 13 which swings over the scale 14 and extends in such a direction that its weight is counterbalanced by the weight of that portion of the coil on one side of the pivots. If for any reason all of the weight of the pointer is not counterbalanced by the coil a very slight counterweight 15 is attached to the hub 12 directly opposite the index 13.

A moving coil constructed in accordance with my invention will swing in a very narrow air gap, and no difficulties are encountered in placing the coil over the core 6, since as shown in Figs. 2 and 5 the opening of the frame on the plane A B is large enough to permit the frame to slip over the core thereby bringing the pivots into alinement with the axis of the core and positioning the coil so that it will swing around the core with proper clearance.

The pole pieces 4 are held in fixed and unchangeable relation to each other by means of space blocks 16, of some suitable nonmagnetic material, such as brass, welded, soldered, or otherwise fastened to the ends of the pole pieces to make the two pole pieces and the space blocks into substantially an integral block of metal which can be machined into any desired shape and will retain that shape indefinitely. The preferred form is that shown in the drawings, in which the pole pieces, each forming approximately a semi-circle, confront each other to leave a cylindrical opening between them and have their adjacent ends secured to the space blocks 16. The entire pole-piece structure may be turned and bored out truly cylindrical like a single block of metal, and the pole pieces cannot change their position with relation to each other. The pole pieces are attached to the magnet by screws or in any suitable way, the poles of the magnet being bored or ground out to fit snugly over the cylindrical pole-piece structure to enable the instrument to be made cheaply with a good magnetic joint between the magnet and the pole pieces. The scale 14 is secured in any suitable way so that it may be removed with the pole piece structure from the magnet.

The core 5 is made truly cylindrical, and it is necessary that it be mounted exactly concentric with the pole pieces 4, in order to secure a uniform annular air gap. This result is secured by providing the core with radial projections 17 and 18 made substantially integral with the core by being held in grooves 19 and 20 by screws or other suitable fastening means and provided with shoulders 21 and 22, at right angles to the axis of the core 5. A ring-shaped cap or core support 23 is attached to the shoulders 21 and 22, and carries in a bridge 24 a bearing 24ᵃ, for the upper pivot of the coil, while to the lower ends of the projections 17 and 18 a cross-bar 25 is secured to carry the lower bearing 26 for the lower pivot of the coil. The cap and bridge are of one piece of metal, and form a very rigid support for the bearing 24ª, which is therefore held in unchangeable relation to the core on account of the metal to metal contact of the cap and its shoulders 21 and 22.

The outer surfaces of the radial projections are shaped to conform to the face of the pole pieces 4, and in the specific form shown in the drawings are made cylindrical to fit snugly against the inner circular wall or pole faces of the pole-piece structure. The distance from the surface of the core to the outer surface of the projections determines the width of the air gap between the pole pieces and the core, and the projections are preferably turned in a lathe, with the axis of the core as a center, to form a cylindrical plug which will fit snugly into the cylindrical opening formed by the pole pieces 4 and the space blocks 16. Since the core is truly concentric with the cylindrical surfaces of the projections 17 and 18, it is necessarily truly concentric with the pole pieces when the parts are assembled and the core is positioned by the projections engaging the faces of the pole pieces 4 and the inner surfaces of the space blocks. The core is therefore positioned concentric with the pole pieces by the projections 17 and 18 and is held in the proper longitudinal position between the pole pieces by the shoulders 21 and 22 which engage the edge of the pole or of pole-piece structure. All the parts which determine the size of the air gap and the location of the core are finished by machine tools and it is therefore possible to put the magnetic system together and secure the exact relation of parts desired without skilled labor.

The parts are so proportioned that the coil cannot strike against the pole pieces while the moving system is being inserted in place or removed, since the projections 17 and 18, as shown in Fig. 4, are considerably longer than the coil; and by the time the moving system is inserted far enough to bring the coil near the pole pieces the projections 17 and 18 are in engagement with the pole pieces, thereby holding the system centered and keeping the lateral motion of the system within such limits that the coil cannot strike the pole pieces. In many instruments heretofore used great care is necessary to prevent striking the coil against the pole piece during the removal or insertion of the moving system, and I desire to be understood as considering to be within the scope of my invention any construction of parts which positively guides or restrains the moving system during its removal or insertion to such an extent that contact of the coil and pole pieces is prevented.

The parts when in the assembled position are rigidly held in proper relation by means of threaded pins 27, which pass through the holes 28 in the space blocks, through holes 29 in the projection 17 and the core, through smaller holes 30 in the projection 18 into threaded holes in the space block, thereby exerting a radial thrust on the core and locking the core and the pole-piece structure together. Removal of the pins permits endwise removal of the core and attached parts, while in reassembling no special care is required as the pins merely fasten the core in place and hold it in fixed and immovable relation to the pole pieces.

It will be noted that the projection 18 is wide enough to span the space block 16 and engage directly with the two adjacent pole faces, thereby accurately positioning the core with relation to the pole faces. As shown in Fig. 8, the pins 27 have shoulders on them which engage the projection 18 and clamp it rigidly in engagement with the pole faces to hold the moving system in position. The pins 27 therefore have nothing to do with positioning the core, but merely act as holding means for maintaining the projection 18 in fixed relation to the pole faces.

My invention may be embodied in many other forms than that shown and described, and I do not wish to be restricted to the exact form shown but intend to cover by the appended claims all changes and modifications within the spirit and scope of my invention.

What I claim as new and desire to secure by Letters Patent of the United States, is,

1. In a measuring instrument, the combination with a magnet having curved confronting pole pieces with their adjacent ends united to non-magnetic space blocks to form an integral structure with a cylindrical opening between the pole pieces, of a cylindrical core having non-magnetic radial projections of equal length to engage the walls of said opening and thereby position the core concentric with said pole pieces, and means for clamping one of said projections to the walls of said opening.

2. In a measuring instrument, the combination with a cylindrical core forming part of a magnetic system, of a moving coil having the form of a section included between parallel planes at different distances from and on opposite sides of the axis of a hollow cylinder larger than said core.

3. In a measuring instrument, the combination with a magnetic system having an annular air gap, of a moving coil forming a part of the surface of a cylinder included between parallel planes at unequal distances from and on opposite sides of a diameter, and pivots mounted in the axis of said cylinder.

4. In a measuring instrument, the combination with a cylindrical core, of a moving coil shaped as a longitudinal section of a cylinder of greater diameter than the core, said section including the axis of the cylinder and being unsymmetrical with reference to said axis, and pivots mounted on the coil in the axis of the cylinder.

In witness whereof, I have hereunto set my hand this 16th day of July, 1908.

CHARLES E. HOLMES.

Witnesses:
JOHN A. MCMANUS, Jr.,
CHARLES A. BARNARD.